UNITED STATES PATENT OFFICE.

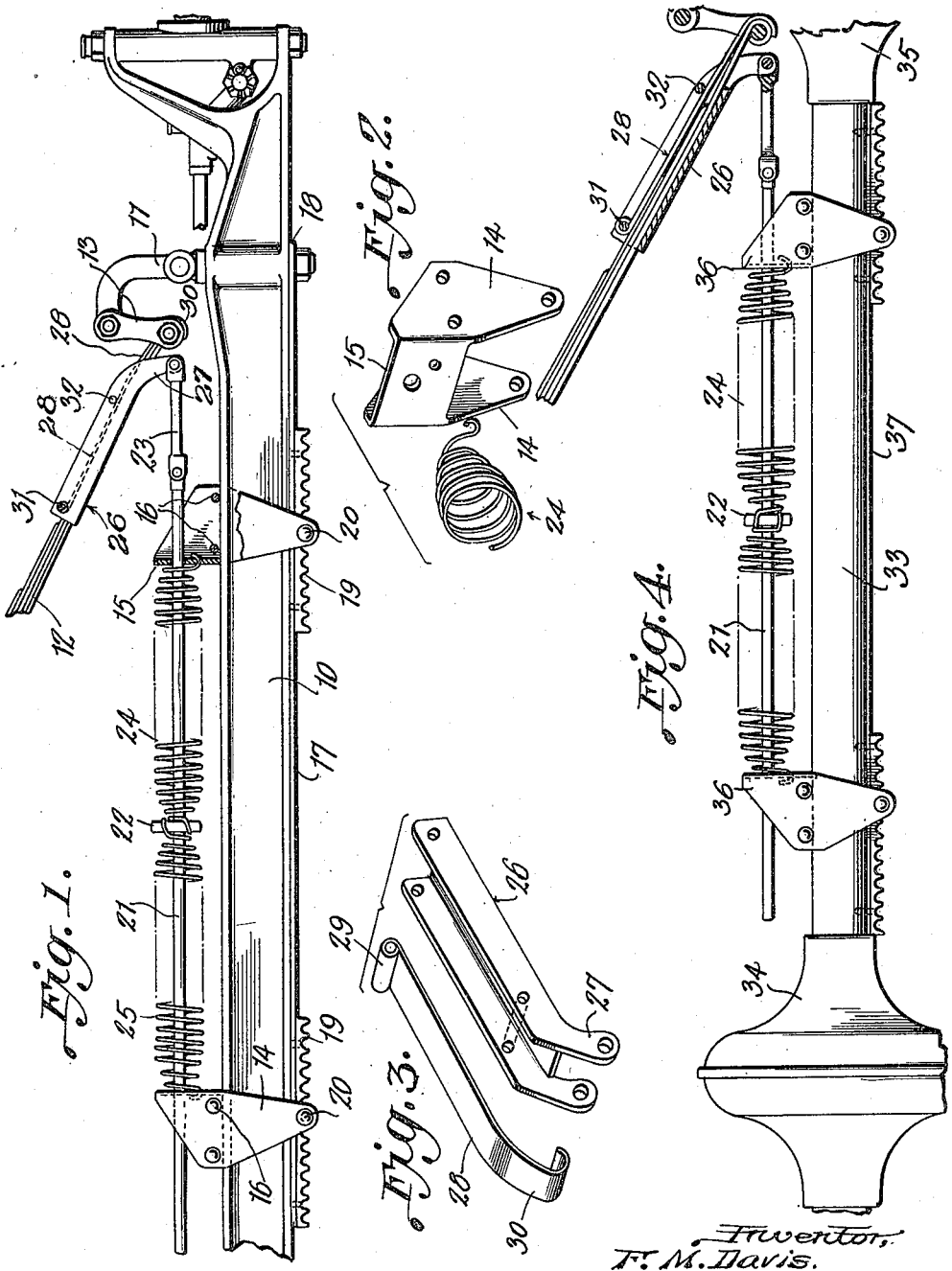

FRANCIS M. DAVIS, OF TIMPSON, TEXAS.

SHOCK-ABSORBER.

1,318,361.  Specification of Letters Patent.  Patented Oct. 14, 1919.

Application filed February 3, 1919. Serial No. 274,660.

*To all whom it may concern:*

Be it known that I, FRANCIS M. DAVIS, citizen of the United States, residing at Timpson, in the county of Shelby and State of Texas, have invented certain new and useful Improvements in Shock-Absorbers, of which the following is a specification.

This invention relates to an improved shock absorber for motor vehicles, being particularly designed for vehicles of the Ford type, and has as its primary object to provide a device of this character which will prevent the breaking of the springs of the vehicle by severe jolting or other undue stress arising under practical working conditions.

The invention has as a further object to provide a shock absorber which will not only effectually relieve the springs of undue strain when being compressed but will also, and what is more important, effectually relieve the springs of undue strain when contracting under rebound, for preventing extreme contracting movement of the springs and thus obviating breaking thereof from this common cause.

And the invention has as a still further object to provide a shock absorber which will normally be free from the stress of the load so that, under ordinary conditions, the cushioning springs of the device will not be under any strain, this arrangement tending, as will be clear, to materially prolong the efficiency of the device.
Other and incidental objects will appear hereinafter. In the drawings:

Figure 1 is a fragmentary front elevation showing my improved device applied to the front spring and axle of a vehicle of the Ford type, Fig. 2 is a perspective view showing one of the supporting yokes of the device in detail and also showing a portion of one of the cushioning springs employed, Fig. 3 is a perspective view showing the spring engaging clamp of the device in detail, and Fig. 4 is a fragmentary rear elevation showing the device modified for connection to the rear axle of a vehicle of the Ford type.

Referring now more particularly to the drawings, I have shown my improved device in connection with the front axle and spring of a vehicle of the Ford type. However, in this connection it is to be understood that I have so illustrated the device simply as a matter of convenience and do not wish to be limited in this regard since, as will appear as the description proceeds, my improved shock absorber is equally well adapted for use upon vehicles of other types. In Fig. 1, the front axle of the vehicle is indicated at 10. One of the front spring perches is indicated at 11, this perch upstanding from the axle and supporting the adjacent end of the front spring 12, swingingly connected to the perch by a shackle 13.

In carrying the invention into effect, I employ companion supporting yokes. As shown in detail in Fig. 2 of the drawings, each of these yokes is preferably formed from a single piece of suitable resilient sheet metal and includes downwardly tapered side arms or plates 14 joined by a connecting plate 15. The side plates 14 are disposed in substantially parallel relation so that these plates of the yokes are, in the manner shown in Fig. 1, thus adapted to snugly embrace the axle 10, the connecting plates of the yokes resting at their lower edges against the upper edge of the axle. Fitted through and extending between the side plates of the respective yokes are spaced cross stop rods or bolts 16 engaging the axle at its upper edge for supporting the yokes to upstand from the axle so that the connection plates 15 are disposed at substantially right angles thereto. Lying against the lower edge of the axle is a spacing plate or bar 17 provided at one end with an eye 18 fitting over the shank of the perch 11 at its lower end and secured by a nut upon the lower terminal of said shank. Secured to the bar or otherwise connected thereto at conveniently spaced points are notched plates or rack bars 19 and adapted to selectively engage in the notches of these rack bars are bolts or other suitable fastening devices 20 removably fitted through the side plates 14 of the yokes at their lower ends for clamping the yokes upon the front axle while coacting with the rack bars for rigidly maintaining the yokes in spaced relation.

Slidably fitted through the connecting plates 15 above the axle in spaced relation thereto, is a horizontal thrust rod 21. Formed on this rod substantially midway of its ends is a stop lug or shoulder 22 and swingingly connected to the outer end of said rod is a link 23. Surrounding the rod at opposite sides of the stop lug and bearing between this stop and the connecting plates 15 of the yokes are helical cushioning springs 24 and 25. The convolutions of these springs are, near the ends of said springs, as will be particularly noted by reference to Fig. 1, gradually contracted so that the terminal convolutions of the springs snugly fit around the rod for thus centering the springs thereon. At their outer ends, the terminals of the springs are, as shown in detail at the left of Fig. 1, engaged with the connecting plates of the yokes while, at their inner ends, the terminals of the springs are similarly connected to the stop lug 22. The springs will thus, as will be seen, be caused to flex in unison upon longitudinal movement of the thrust rod 21.

Mounted upon the spring 12 near its adjacent end is a clamp, shown in detail in Fig. 3 of the drawings. This clamp includes a channel plate 26 tapered longitudinally to snugly receive the end portion of the spring therethrough and formed at its outer end with depending lugs 27 extending at opposite side edges of the spring therebeneath. Fitting between the side walls of the channel plate to co-act therewith is an anchoring plate 28 formed at its inner end with an eye 29 and at its outer end with a hook 30. Removably fitted through the side walls of the channel plate and extending through the eye 29 is a bolt or other suitable fastening device 31 connecting the anchoring plate with the channel plate and binding the clamp at its inner end upon the spring. Removably fitted through the side walls of the channel plate adjacent its outer end is a bolt or other suitable fastening device 32 overlying the anchoring plate and binding the clamp adjacent its outer end upon the spring. At its outer end the anchoring plate projects beyond the channel plate and the hook 30 thereof is engaged around the adjacent terminal bearing loop or eye of the spring 12 between the plates of the shackle 13 for thus rigidly anchoring the clamp upon the spring. As particularly shown in Fig. 1, the link 23 upon the thrust rod 21, is at its outer end pivotally connected with the lugs 27 of the channel plate so that the thrust rod is accordingly engaged operatively with the adjacent outer end of the spring.

As will now be readily understood, the spring 12 will, under the influence of a shock communicated through the axle 10, be compressed and accordingly flattened, when the shackles at opposite ends of the spring will be swung outward proportionately. The thrust rod 21 will, therefore, be drawn outwardly upon the supporting yokes to compress the spring 24 and expand the spring 25. In this connection it will, of course, be understood that, in practical use, a pair of the devices will be mounted at opposite ends of the axle and connected with the opposite ends of the spring 12. Thus, the springs 24 and 25 will serve to resist outward swinging movement of the vehicle spring shackles and will accordingly cushion the shock upon the spring 12 to prevent undue compression or flattening thereof. Upon the rebound of the spring 12, the spring shackles will swing inwardly so that the rod 21 will thus be shifted inwardly to expand the spring 24 and compress the spring 25. These springs will, therefore, also serve to resist contracting movement of the vehicle spring for cushioning the rebound. At the same time, extreme flexing of the spring when rebounding will be prevented so that breaking of the spring from this common cause will thus be effectually obviated. I accordingly provide an arrangement wherein the easy riding qualities of the vehicle will be materially enhanced and the possibility of breaking of the springs from shock reduced to a minimum as well. In the normal position of the spring 12, as shown in Fig. 1, the stop lug 22 upon the thrust rod 21 will be disposed substantially midway between the supporting yokes of the device. Consequently, under normal conditions, the springs 24 and 25 will not be subjected to any load stress. As will be seen, this arrangement will tend to materially prolong the efficiency of the device. However, in this connection it is to be noted that since the normal curvature of the front springs of different vehicles will vary somewhat, it will be necessary to vary the position of the device upon the front axle accordingly, when applying the device to different vehicles, in order that the cushioning springs of the device may normally be relieved of load strain. I accordingly provide for the adjustment of the supporting yokes of the device longitudinally upon the vehicle axle. As will be seen, these yokes may be moved along the axle with respect to the normal position of the adjacent end of the vehicle spring and then locked in adjusted position by the engagement of the fastening devices 20 through the yoke arms to coact with the rack bars 19 and clamp the yokes upon the axle. Furthermore, as will also be seen, this construction provides an arrangement whereby the yokes may be positioned longitudinally of the axle with respect to each other for normally tensioning the cushioning springs if desired.

In Fig. 4 of the drawings, I have shown the device modified for use upon the rear axle of a vehicle of the Ford type. In this figure, one end portion of the rear axle casing is indicated at 33, this casing being cylindrical. At the inner end of the portion 33 of the casing is the differential housing 34 while at its outer end is a brake housing 35. Yokes 36 are employed. These yokes correspond to the yokes of the preferred construction but the side plates thereof curve longitudinally to snugly fit around the end portion 33 of the casing. A spacing bar 37 is also employed. This spacing bar corresponds to the spacing bar 17 of the preferred construction. However, in the modified structure, the spacing bar 37 is of a length to snugly fit between the shoulders formed at opposite ends of the portion 33 of the rear axle housing by the differential housing and brake housing, the bar coacting with said shoulders to be thus held against longitudinal movement. The yokes 36 are connected with the spacing bar 37 as in the preferred construction so that said yokes may be locked in adjusted position fixed upon the axle. Otherwise, this modified form of the invention is identical with the preferred construction and it is accordingly believed that further description of the modification is unnecessary.

Having thus described the invention what is claimed as new is:

1. A shock absorber including spaced guide members, means for connecting each of said members with a vehicle axle, and respectively operable for adjustably positioning the members with respect to each other, a thrust rod slidable longitudinally upon the members, means for operatively connecting one end of the rod with one end of a vehicle spring, and yieldable means for resisting longitudinal movement of the rod in opposite directions.

2. A shock absorber including spaced guide members, means carried by said members to embrace a vehicle axle, means carried by said first mentioned means for connecting the guide members with an axle of a vehicle, a thrust rod slidable longitudinally upon the members, means for operatively connecting one end of the rod with one end of a vehicle spring, and yieldable means for resisting longitudinal movement of the rod in opposite directions.

3. A shock absorber including spaced guide members, a spacing bar fixed against longitudinal movement, means engaging the guide members and adapted to coact with the bar for securing the guide members in fixed position upon a vehicle axle, a thrust rod slidable longitudinally upon the members, means for operatively connecting one end of the rod with one end of a vehicle spring, and yieldable means for resisting longitudinal movement of the rod in opposite directions.

4. A shock absorber including spaced guide members, a spacing bar fixed against longitudinal movement, means engaging the guide members and adapted to operatively coact with said bar for securing the guide members fixed in longitudinally adjusted position with respect to a vehicle axle, a thrust rod slidable longitudinally upon the members, means for operatively connecting one end of the rod with one end of a vehicle spring, and yieldable means for resisting longitudinal movement of the rod in opposite directions.

5. A shock absorber including companion yokes comprising side plates joined by connecting plates, means for connecting the yokes with a vehicle axle embraced by the side plates of said yokes, a thrust rod slidable longitudinally through the connecting plates of said yokes, means for operatively connecting one end of the rod with one end of a vehicle spring, and yieldable means for resisting longitudinal movement of the rod in opposite directions.

6. A shock absorber including companion yokes comprising side plates, a spacing bar, means carried by the side plates for connecting the yokes with a vehicle axle embraced by the plates, said means operatively coacting with the bar for holding the yokes fixed with respect to each other, a thrust rod slidable longitudinally through the connecting plates of said yokes, means for operatively connecting one end of the rod with one end of a vehicle spring, and yieldable means for resisting longitudinal movement of the rod in opposite directions.

7. A shock absorber including spaced guide members, means for connecting said members with a vehicle axle, a thrust rod slidable longitudinally upon said members, means for operatively connecting said rod at one end with one end of a vehicle spring, a stop upon the rod, and cushioning means bearing between said stop and the guide members and connected therewith to act in unison for resisting longitudinal movement of the rod in opposite directions.

8. A shock absorber including spaced guide members, means for connecting said members with a vehicle axle, a thrust rod slidable longitudinally upon the members, means for resisting longitudinal movement of the rod in opposite directions, and an anchoring clamp for pivotally connecting the rod at one end with one end of a vehicle spring, said clamp including a channel plate adapted to embrace the spring and operatively connected with the rod, and an anchoring plate connected with the channel plate for securing the clamp upon the spring and provided with means engaging the adjacent end of the spring.

9. A shock absorber including spaced guide members, means for connecting said members with a vehicle axle, a thrust rod slidable longitudinally upon the members, means for resisting longitudinal movement of the rod in opposite directions, and an anchoring clamp for pivotally connecting the rod at one end with one end of a vehicle spring, said clamp including a channel plate adapted to embrace the spring and operatively connected with the rod, and an anchoring plate connected with the channel plate for securing the clamp upon the spring and provided with a hook engaging over the adjacent end of the spring.

10. A shock absorber including spacing means, guide members freely movable relative to each other independent of said spacing means but operatively coacting therewith to be held by said means in spaced relation, a thrust element shiftable longitudinally upon said guide members, means for operatively connecting said element with a vehicle spring, and cushioning means for resisting longitudinal movement of the element.

11. A shock absorber including spacing means, guide members freely movable relative to each other independently of said spacing means, means for securing said guide members to a vehicle axle coacting with said spacing means for holding the guide members in spaced relation, a thrust element shiftable longitudinally upon said guide members, means for operatively connecting said element with a vehicle spring, and cushioning means for resisting longitudinal movement of the element.

12. A shock absorber including spacing means, guide members, means for securing said guide members to a vehicle axle at one side thereof coacting with said spacing means at the opposite side of the axle for holding the guide members in spaced relation, a thrust element shiftable upon said guide members, means for connecting said element with a vehicle spring, and cushioning means for resisting movement of the element.

In testimony whereof I affix my signature.

FRANCIS M. DAVIS. [L. S.]

Copies of this patent may be obtained for five cents each, by addressing the "Commissioner of Patents, Washington, D. C."